Figure 1:
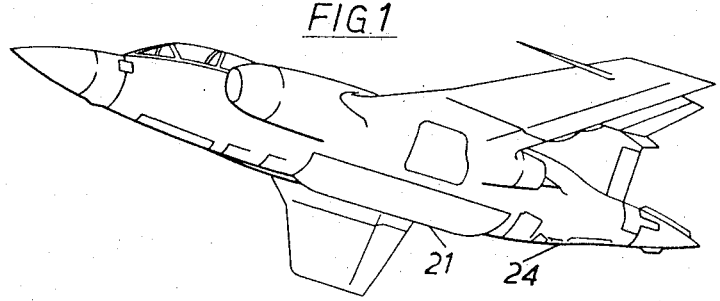

United States Patent
Maynard et al.

[11] 3,765,626
[45] Oct. 16, 1973

[54] AIRCRAFT

[75] Inventors: Harry Maynard, Brough, East Yorkshire; Roy Desmond Boot, Hull, Yorkshire, both of England

[73] Assignee: Hawker Siddeley Aviation Limited, Surrey, England

[22] Filed: Oct. 6, 1971

[21] Appl. No.: 187,083

[30] Foreign Application Priority Data
Oct. 6, 1970 Great Britain.................. 47,499/70

[52] U.S. Cl. .......................... 244/129 D, 244/135 R
[51] Int. Cl............................................ B64d 37/04
[58] Field of Search..................... 244/135 R, 129 D

[56] References Cited
UNITED STATES PATENTS

| | | | |
|---|---|---|---|
| 3,039,721 | 6/1962 | Rogers............................ | 244/135 R |
| 1,976,456 | 10/1934 | Noonan........................... | 244/135 R |
| 2,947,533 | 8/1960 | Brumby et al.............. | 244/129 D X |
| 2,634,656 | 4/1953 | Woollens et al................ | 244/129 D |

Primary Examiner—Milton Buchler
Assistant Examiner—Gregory W. O'Connor
Attorney—Rose & Edell

[57] ABSTRACT

For fuel storage aboard an aircraft a turnover door mounted on central pivots, which closes an armaments compartment in the underbelly of the fuselage, is adapted to serve as a fuel tank. Rotary fluid transfer couplings provided at the ends of the tank concentric with the pivots enable fuel to be transferred between the door tank and the main fuel system and also allow venting of the tank.

8 Claims, 10 Drawing Figures

PATENTED OCT 16 1973

3,765,626

SHEET 1 OF 5

Inventors
HARRY MAYNARD
& ROY DESMOND BOOT

By Rose & Edell
Attorneys

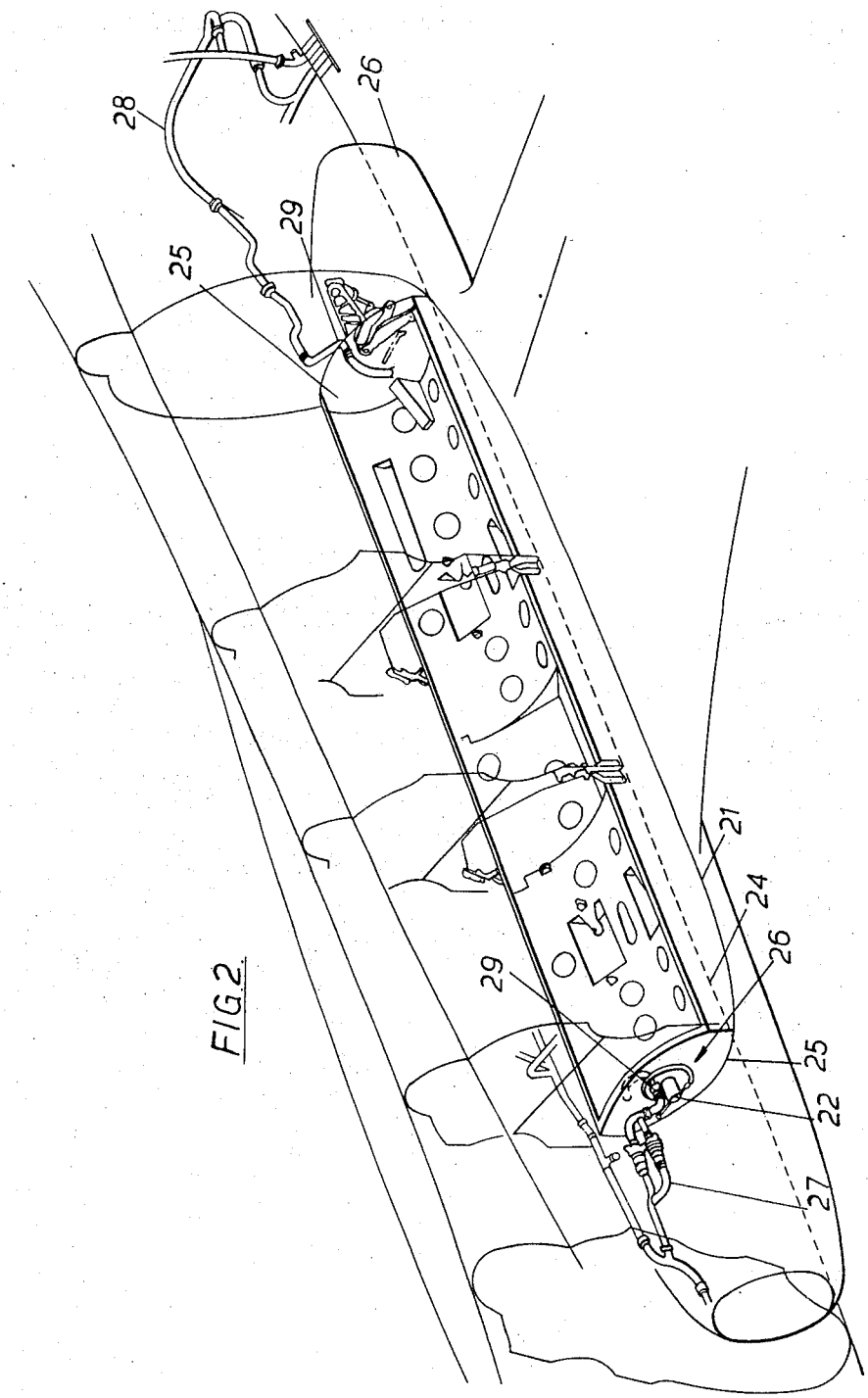

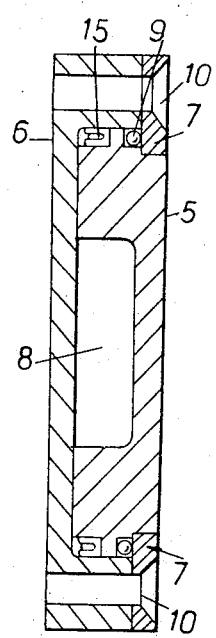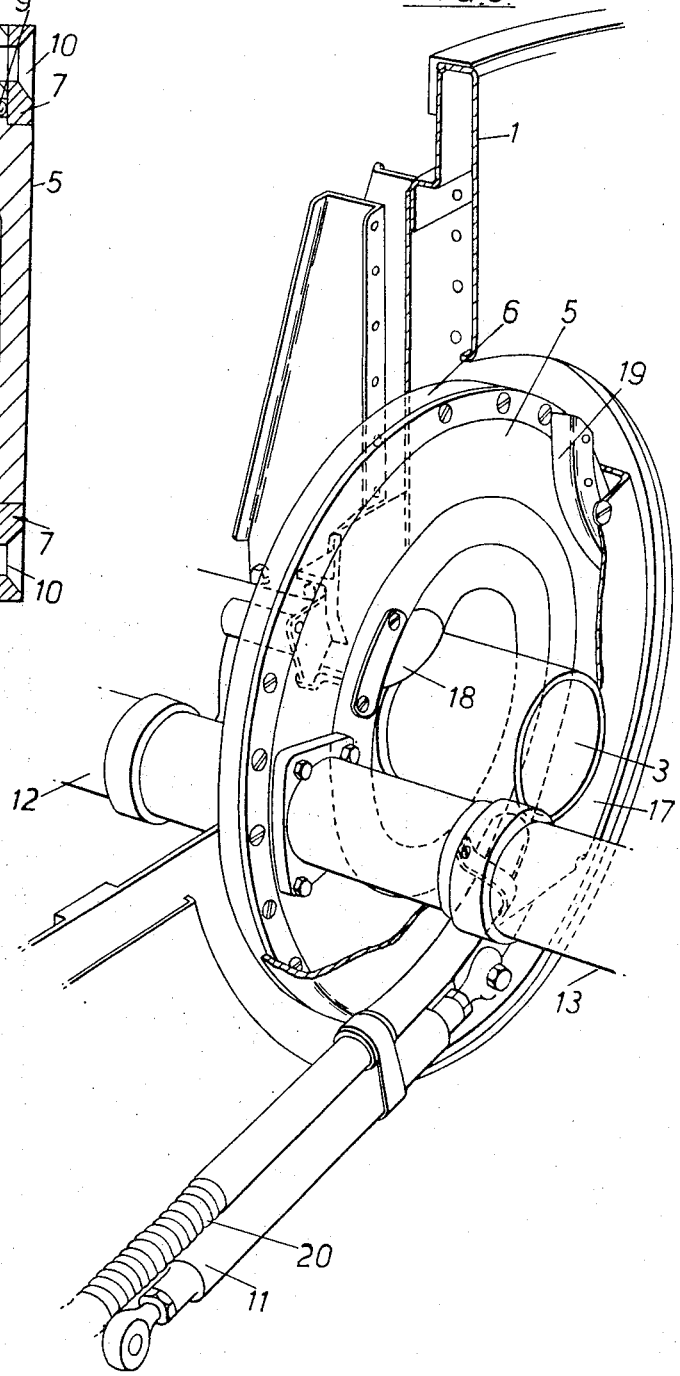

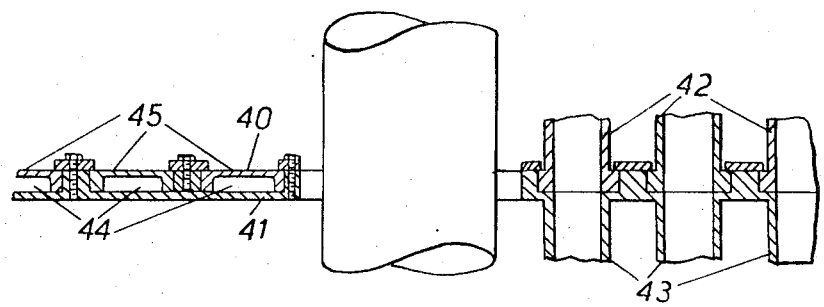
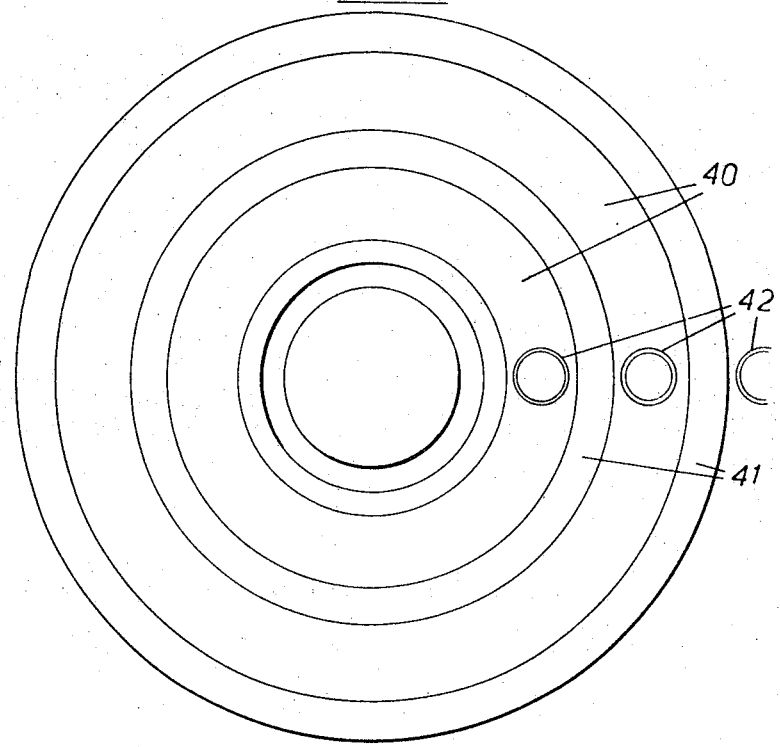

AIRCRAFT

This invention relates to aircraft, and more particularly the storage of fuel aboard aircraft.

One of the problems associated with aircraft is the additional space requirement for fuel storage which is necessary when it is desired to extend their operational range, being over and above that for which they were designed. Various methods exist which provide auxiliary storage. The most common of these employs external fuel pods or aerodynamically-shaped containers on wings or fuselage and which can, if necessary, be jettisoned once the fuel is used. This has been particularly a solution in the case of military aircraft. It is an object of the invention to provide a more elegant solution to the problem of auxiliary fuel storage.

According to one aspect of the present invention, fuel storage is provided aboard an aircraft within one or more aircraft doors; and, more specifically, an under-belly fuselage door or doors for closing an equipment or armaments compartment.

This scheme is particularly advantageous if, instead of twin hinging doors, the compartment has across its whole width a single door that turns over about a central pivot. Whereas under-belly compartments or bays usually have downwardly-opened hinged doors it is also possible to fit a turnover door rotating through 180° about central end pivots, the equipment or armaments being mounted on that which constitutes the upper side of the door when the compartment is closed, and it is primarily with this type of door in mind that the invention has been conceived.

However, the rotation of the door means that a satisfactory way has to be found for the transfer of the fuel from the door tank to the aircraft fuel system. One solution would be to use the door pivots but these are normally already employed for the passage of electrical services to the door.

According to a further aspect of the invention, a rotary coupling is provided, for the transfer of at least one liquid between relatively rotating assemblies, comprising an annular stator and a co-operating annular rotor, the stator and rotor being in mutual contiguity and concentric with the axis of relative rotation, and there being an annular channel in one providing fluid flow passage continuity between respective flow ports in the stator and rotor when relative rotation occurs.

In the specific case of the rotating door fuel tank, the rotor of the coupling may be secured rigidly to the tank end and may itself carry the stator mounted in a channel in the rotor, the stator being held against rotation by a universally-jointed tie rod connection to the aircraft fuselage structure. Such electric cables as may be necessary, additional to those already conducted through the door pivot, can be carried in a coiled flexible conduit associated with the rotary coupling and designed to permit the required amount of relative rotation without intolerable bending of the cables.

Figure 3A:
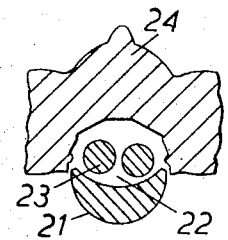
Figure 3B:
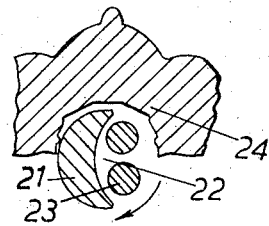
Figure 3C:
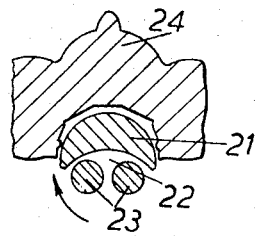
Figure 4:
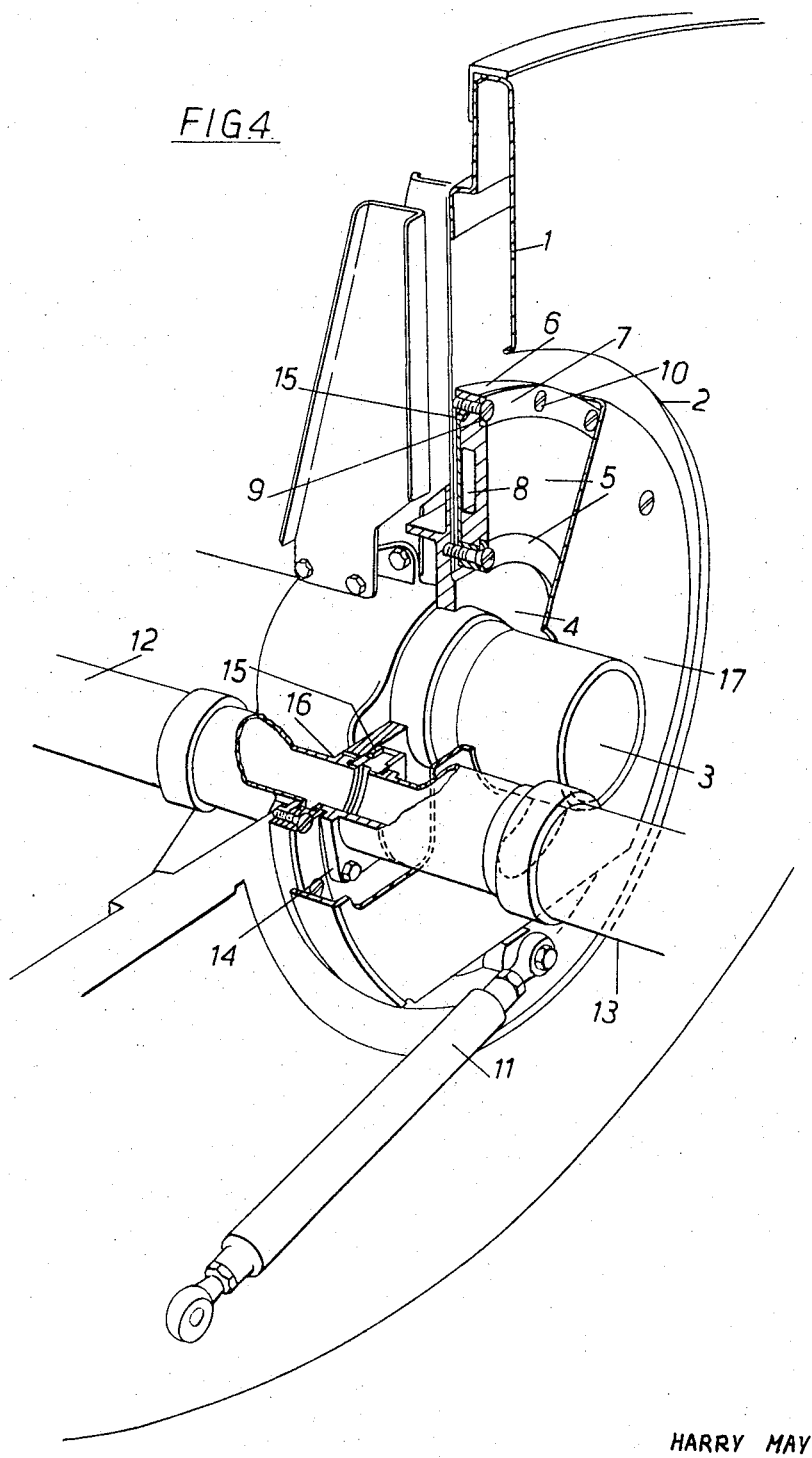

Arrangements in accordance with the invention will now be described, by way of example, with reference to the accompanying drawings, in which:

FIG. 1 is a general pictorial view of an aircraft equipped according to the invention, FIG. 2 is a pictorial view of the rotating door of the aircraft, FIGS. 3A, 3B and 3C are cross-sectional diagrams illustrating door rotation, FIG. 4 is a pictorial view showing the detail of a rotary coupling at one end of the door, FIG. 5 shows a cross section through the coupling of FIG. 4, FIG. 6 is another view of the coupling showing the passage of electric cables, and FIGS. 7 and 8 are a cross-sectional view and an end elevation of another form of coupling.

FIGS. 1 and 2 illustrate an aircraft equipped with a rotating door tank according to the invention. An armaments compartment in the under-belly of the fuselage 24 has a door 21 arranged to rotate about end pivots 22 and providing support for the armaments within the compartment. FIGS. 3A, 3B and 3C show the manner of rotation of the door 21 through 180° to disclose the armaments 23. The door is enlarged to some extent to provide a fuel tank of good capacity.

Each end wall 25 of the door tank is fitted with a rotary coupling 26 for fluid flow between the rotating tank and the stationary piping systems of the aircraft. Pipe connections 29 on these couplings are connected, respectively, to the fuel supply system 27 and the tank venting system 28 of the aircraft. The rotary coupling construction is shown in detail in FIGS. 4 and 5.

Each rotary coupling comprises an annular rotor or main body 6 rigidly mounted on the door tank end wall and concentrically placed about the door pivot 3. A stator or inner disc 5, with suitable seals and bearings, slides circumferentially within a channel in the rotor 6 but is itself prevented from turning by a ball-ended tie rod 11 which is the sole attachment of this stator to the fixed fuselage structure. A more rigid connection would be unacceptable as structural deflections between the door tank and fuselage would unduly strain the coupling.

Each end of the door tank has a double-walled diaphragm or frame 1. The outer web of this acts as a rubbing plate to adjacent parts and is cut away with a flanged hole 2 to disclose the rotary coupling mounted on the inner web and located concentrically about the door pivot 3 which is rigidly mounted on the tank diaphragm by means of a machined flange 4. The stator 5 of the rotary coupling, located within the rotor 6, has a bearing 9 and associated polytetra-fluorethylene seals 15, the whole stator assembly being located by retaining rings 7 and screws 10 which screws also serve to secure both the rotor and stator of the coupling assembly to the inner web of the end tank diaphragm 1.

The stator 5 is formed, in its vertical face contiguous with the rotor, with an annular channel 8 which provides fluid flow passage continuity between the tank fuel transfer pipes 12 and 13 via holes in the stator and rotor walls. These holes are of a diameter substantially equal to the channel width and located on the pipe centre lines. The two pipes 12 and 13 are rigidly connected to the rotor and stator, respectively, with suitably sealed machined flanges 16 and 14.

It will be seen that with the bomb door closed, pipes 12 and 13 are substantially in alignment giving a direct fuel flow across the joint. Should there be any door tank rotation at all with relative movement of the pipes, flow continuity will be maintained via the annular channel 8.

FIG. 6 shows the arrangement for permitting the passage of electrical cables over and above those passing through the pivot. A flexible conduit 20 strapped to the tie rod 11 passes into a protective cowling 17 (more clearly shown in FIG. 4) and is coiled around the door pivot 3 as shown before passing into the tank via an elbow pipe 18, between the rotor and the pivot, and through an adequately sealed joint in the tank diaphragm. A rubbing plate 19 protects the conduit 20 against trapping during tank rotation when the conduit will uncoil.

While in the above description only transfer of a single liquid, i.e. fuel, through the rotary coupling is contemplated, it will be understood that a number of different liquids can, if desired, be transferred from storage within a divided tank. FIGS. 7 and 8 show an arrangement for this in which the stator 40 and rotor 41 of the rotary coupling have multiple pairs of pipe connections 42, 43, each pair co-operating with an individual one of a multiple series of annular transfer channels 44 set at different radii in the stator. In this case the stator may be in the form of an assembly of suitably interconnected rings 45 of different radii.

What we claim is:

1. An aircraft having a fuselage structure with an underbelly compartment for equipment or armaments, and comprising a door for opening and closing said compartment which door extends across the whole width of said compartment and is mounted to turn over about a pair of end pivot assemblies aligned on a central fore and aft pivot axis, said door having inner and outer walls enclosing between them a cavity constituting a storage tank for liquid fuel, and at least one of said pivot assemblies including a rotary coupling for the transfer of said liquid fuel between the fuel tank in said door and the fuselage structure.

2. An aircraft according to claim 1, wherein said rotary coupling comprises an annular stator and a cooperating annular rotor, the stator and rotor being in mutual contiguity and concentric with said pivot axis, and there being an annular channel in one providing fluid flow passage continuity between respective flow ports in the stator and rotor when relative rotation occurs.

3. An aircraft according to claim 2, wherein the rotor is secured rigidly to the end of said door fuel tank and carries the stator mounted in a channel in the rotor, the stator being held against rotation by a universally-jointed tie rod connection to the aircraft fuselage structure.

4. An aircraft according to claim 3, wherein electric cables are carried in a coiled flexible conduit associated with the rotary coupling and designed to permit the required amount of relative rotation without intolerable bending of the cables.

5. An aircraft according to claim 3, wherein the rotor and stator have respective transfer pipes connected thereto, the ends of which pipes are in alignment when the turnover door is closed.

6. An aircraft according to claim 2, having a plurality of concentric annular channels, and a plurality of pairs of pipe connections for the transfer of a plurality of different liquids.

7. An aircraft according to claim 6, wherein the stator is built up from an assembly of interconnected rings of different radii.

8. An aircraft according to claim 2, wherein the door has a rotary coupling at each end, one coupling being for the transfer of fuel and the other for venting.

* * * * *